US010209886B2

(12) United States Patent
Fu (10) Patent No.: US 10,209,886 B2
(45) Date of Patent: Feb. 19, 2019

(54) METHOD FOR ADAPTIVELY ADJUSTING DIRECTIONALLY DECREASING COLUMNAR LAYOUT OF VIRTUAL KEYS FOR SINGLE HANDED USE BASED ON A DIFFERENCE BETWEEN LEFT AND RIGHT ERROR INPUT COUNTERS (71) Applicant: ZTE Corporation, Shenzhen (CN)

(72) Inventor: Chun Fu, Shenzhen (CN)

(73) Assignees: ZTE CORPORATION, Shenzhen (CN); XI'AN ZHONGXING NEW SOFTWARE CO., LTD., Xi'An (CN)

(*) Notice: Subject to any disclaimer, the term of this patent is extended or adjusted under 35 U.S.C. 154(b) by 261 days.

(21) Appl. No.: 14/908,430

(22) PCT Filed: Oct. 22, 2013

(86) PCT No.: PCT/CN2013/085714
§ 371 (c)(1),
(2) Date: Jan. 28, 2016

(87) PCT Pub. No.: WO2014/161295
PCT Pub. Date: Oct. 9, 2014

(65) Prior Publication Data
US 2016/0188203 A1 Jun. 30, 2016

(30) Foreign Application Priority Data
Aug. 5, 2013 (CN) .......................... 2013 1 0337335

(51) Int. Cl.
G06F 3/023 (2006.01)
G06F 3/041 (2006.01)
G06F 3/0488 (2013.01)

(52) U.S. Cl.
CPC ........ *G06F 3/04886* (2013.01); *G06F 3/0236* (2013.01); *G06F 3/0418* (2013.01)

(58) Field of Classification Search
CPC ... G06F 3/04886; G06F 3/0236; G06F 3/0418
See application file for complete search history.

(56) References Cited

U.S. PATENT DOCUMENTS 6,102,594 A * 8/2000 Strøm ................... G06F 3/0234
341/21
8,504,934 B1 * 8/2013 Yu ....................... G06F 3/04886
200/5 A (Continued)

FOREIGN PATENT DOCUMENTS

CN 102129341 A 7/2011
CN 102662603 A 9/2012

(Continued)

OTHER PUBLICATIONS

International Search Report for corresponding application PCT/CN2013/085714 filed on Oct. 22, 2013; dated May 6, 2014.

(Continued)

Primary Examiner — Abdullah Al Kawsar
Assistant Examiner — Jeremy L Stanley
(74) Attorney, Agent, or Firm — Cantor Colburn LLP (57) ABSTRACT Provided is a device for adaptively adjusting a layout of a touch input panel, including: an input information counting component, configured to count error input information of virtual keys in real time; a holding mode judgement component, configured to judge, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side where fewer error inputs occur; and a panel layout adjustment component, configured to adjust an overall layout of the input panel and a current UI, and arrange the virtual keys (Continued)

to places where the single hand holding the mobile terminal is capable of completely controlling them.

7 Claims, 4 Drawing Sheets

(56) References Cited

U.S. PATENT DOCUMENTS

| | | | | |
|---|---|---|---|---|
| 8,698,764 B1* | 4/2014 | Karakotsios | ......... | G06F 1/1692 345/173 |
| 9,176,668 B2* | 11/2015 | Eleftheriou | ......... | G06F 3/04842 |
| 2004/0183833 A1* | 9/2004 | Chua | ...................... | G06F 3/0237 715/773 |
| 2005/0206730 A1* | 9/2005 | Hagiwara | ............. | G06F 3/0426 348/169 |
| 2007/0236460 A1 | 10/2007 | Young et al. | | |
| 2009/0106694 A1 | 4/2009 | Kraft et al. | | |
| 2009/0237359 A1* | 9/2009 | Kim | .................... | G06F 3/04886 345/168 |
| 2010/0053088 A1* | 3/2010 | Bae | ......................... | G06F 3/041 345/168 |
| 2010/0079310 A1* | 4/2010 | Nachman | .............. | G06F 3/0233 341/23 |
| 2010/0241985 A1* | 9/2010 | Kim | .................... | G06F 3/04886 715/773 |
| 2010/0259561 A1* | 10/2010 | Forutanpour | ......... | G06F 3/0216 345/660 |
| 2011/0320974 A1* | 12/2011 | Bai | ......................... | G06F 3/016 715/773 |
| 2012/0075194 A1* | 3/2012 | Ferren | ................ | G02B 13/0065 345/168 |
| 2012/0162078 A1* | 6/2012 | Ferren | ................ | G06F 3/04886 345/168 |
| 2012/0169613 A1* | 7/2012 | Armstrong | ............ | G06F 3/0233 345/173 |
| 2013/0044063 A1 | 2/2013 | Kim | | |
| 2013/0113717 A1* | 5/2013 | Van Eerd | ............ | G06F 3/04883 345/173 |
| 2013/0152002 A1* | 6/2013 | Menczel | ............... | G06F 3/0488 715/765 |
| 2013/0278565 A1* | 10/2013 | Park | ...................... | G06F 3/0418 345/178 |
| 2013/0286573 A1* | 10/2013 | Adams | .................. | G06F 1/1694 361/679.2 |
| 2014/0019903 A1* | 1/2014 | Sohn | .................... | G06F 3/04886 715/773 |
| 2014/0062932 A1* | 3/2014 | Ebata | .................. | G06F 3/04886 345/173 |
| 2014/0082546 A1* | 3/2014 | Yang | .................... | G06F 3/04886 715/773 |
| 2014/0098024 A1* | 4/2014 | Paek | .................... | G06F 3/04886 345/168 |
| 2014/0098036 A1* | 4/2014 | Paek | ....................... | G06F 3/023 345/173 |
| 2014/0164973 A1* | 6/2014 | Greenzeiger | ....... | G06F 3/04886 715/773 |
| 2014/0181721 A1* | 6/2014 | Buck | .................... | G06F 3/04886 715/773 |
| 2014/0247221 A1* | 9/2014 | Ferren | ................ | G02B 13/0065 345/168 |
| 2015/0067572 A1* | 3/2015 | Bai | ...................... | G06F 3/04886 715/773 |
| 2015/0109151 A1* | 4/2015 | Page | ...................... | G06F 3/0235 341/22 |
| 2015/0317076 A1* | 11/2015 | Goel | ...................... | G06F 3/0488 345/173 |
| 2015/0346905 A1* | 12/2015 | Winer | .................... | G06F 3/0418 345/178 |
| 2016/0070466 A1* | 3/2016 | Chaudhri | ............... | G06F 3/0484 715/765 |
| 2017/0010806 A1* | 1/2017 | Pingco | ................ | G06F 3/04886 |

FOREIGN PATENT DOCUMENTS

| | | |
|---|---|---|
| CN | 102681670 A | 9/2012 |
| CN | 102694915 A | 9/2012 |
| CN | 102810039 A | 12/2012 |
| CN | 103064629 A | 4/2013 |
| JP | 2012104126 A | 5/2012 |
| JP | 2012203653 A | 10/2012 |
| JP | 2012523611 A | 10/2012 |

OTHER PUBLICATIONS

Extended European Search Report dated Jul. 26, 2016 re: Application No. 13880875.3-1972 (PCT/CN2013085714), pp. 1-8, citing: US 2007/236460 A1, US 2009/106694 A1 and US 2013/044063 A.

* cited by examiner

METHOD FOR ADAPTIVELY ADJUSTING DIRECTIONALLY DECREASING COLUMNAR LAYOUT OF VIRTUAL KEYS FOR SINGLE HANDED USE BASED ON A DIFFERENCE BETWEEN LEFT AND RIGHT ERROR INPUT COUNTERS

TECHNICAL FIELD

The present disclosure relates to the field of mobile terminals, and in particular to a device and a method for adaptively adjusting a layout of a touch input panel, and a mobile terminal.

BACKGROUND

At present, mobile phones with large touch screens, particularly smart mobile phones with touch screens, have become the mainstream of the personal terminal market, and moreover, the size of the screens is tending to increase continuously. Enlarged touch screens, while enabling a good user experience in many aspects, also bring a few problems to users. For example, under the influence of usage habits and touch detection algorithms, the character selection accuracy of a user when using virtual keys on a virtual keyboard is worse than the character selection accuracy when using a physical keyboard. Moreover, there is another factor amplifying the effect of this disadvantage, that is, some users are used to operating with a single hand, however, operating with a single hand would easily result in the problem of error input when the user selects the virtual key in a relatively far area on the screen.

SUMMARY

The embodiments of the present disclosure provide a device for adaptively adjusting a layout of a touch input panel, to solve the technical problem existing in the related art that error input easily occurs.

According to one aspect of the embodiments of the present disclosure, a device for adaptively adjusting a layout of a touch input panel is provided, including:

an input information counting component, which is configured to count error input information of virtual keys in real time when a user performs a touch input operation using an input panel;

a holding mode judgement component, which is configured to judge, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; and a panel layout adjustment component, which is configured to adjust an overall layout of the input panel and a current UI according to a current holding mode of the user, and arrange the virtual keys to places where the single hand of the user holding the mobile terminal is capable of completely controlling the virtual keys.

In an example embodiment, the input information counting component is further configured to:

acquire press information of the user;

judge whether a virtual key pressed the second-to-last time is a Delete key;

when the virtual key pressed the second-to-last time is the Delete key, count this input operation as an error input.

In an example embodiment, the holding mode judgment component is further configured to:

judge whether a key corresponding to the error input is adjacent to a key pressed the last time;

when the key corresponding to the error input is adjacent to the key pressed the last time, continue to judge whether the key corresponding to the error input is located on a left side or a right side of an initial layout of the virtual keys; when the key corresponding to the error input is located on the left side of the initial layout of the virtual keys, add one to a value of a counter for counting error inputs on the left side; when the key corresponding to the error input is located on the right side of the initial layout of the virtual keys, add one to a value of a counter for counting error inputs on the right side.

In an example embodiment, the holding mode judgement component is further configured to:

compare the value of the counter for counting the error inputs on the left side with the value of the counter for counting the error inputs on the right side;

when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, judge that the user is holding and operating the mobile terminal with the right hand only;

when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, judge that the user is holding and operating the mobile terminal with the left hand only.

In an example embodiment, the panel layout adjustment component is further configured to:

when the user holds and operates the mobile terminal with the left hand only, adjust a layout of a virtual keyboard into an arrangement of decreasing the number of virtual keys in turn from left to right;

when the user holds and operates the mobile terminal with the right hand only, adjust the layout of the virtual keyboard into an arrangement of decreasing the number of virtual keys in turn from right to left.

According to another aspect of the embodiments of the present disclosure, a method for adaptively adjusting a layout of a touch input panel is provided, including:

counting error input information of virtual keys in real time when a user performs a touch input operation using an input panel;

judging, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; and adjusting an overall layout of the input panel and a current UI according to a current holding mode of the user, and arranging the virtual keys to places where the single hand of the user holding the mobile terminal is capable of completely controlling the virtual keys.

In an example embodiment, counting the error input information of the virtual keys in real time when the user performs the touch input operation using the input panel includes:

acquiring press information of the user;

judging whether a virtual key pressed the second-to-last time is a Delete key;

when the virtual key pressed the second-to-last time is the Delete key, counting this input operation as an error input.

In an example embodiment, judging, when the number of error inputs occurring in a region on one side of the input panel is apparently more than the number of error inputs occurring in a region on the other side of the input panel, that the user is holding and operating the mobile terminal with a single hand and the user is currently holding, by the single hand, the side of the mobile terminal where fewer error inputs occur includes:

judging whether a key corresponding to the error input is adjacent to a key pressed the last time;

when the key corresponding to the error input is adjacent to the key pressed the last time, continuing to judge whether the key corresponding to the error input is located on a left side or a right side of an initial layout of the virtual keys; when the key corresponding to the error input is located on the left side of the initial layout of the virtual keys, adding one to a value of a counter for counting error inputs on the left side; when the key corresponding to the error input is located on the right side of the initial layout of the virtual keys, adding one to a value of a counter for counting error inputs on the right side.

In an example embodiment, judging, when the number of error inputs occurring in a region on one side of the input panel is apparently more than the number of error inputs occurring in a region on the other side of the input panel, that the user is holding and operating the mobile terminal with a single hand and the user is currently holding, by the single hand, the side of the mobile terminal where fewer error inputs occur further includes:

comparing the value of the counter for counting the error inputs on the left side with the value of the counter for counting the error inputs on the right side;

when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, judging that the user is holding and operating the mobile terminal with the right hand only;

when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, judging that the user is holding and operating the mobile terminal with the left hand only.

In an example embodiment, adjusting the overall layout of the input panel and the current UI according to the current holding mode of the user, and arranging the virtual keys to places where the single hand of the user holding the mobile terminal is capable of completely controlling the virtual keys includes:

when the user holds and operates the mobile terminal with the left hand only, adjusting a layout of a virtual keyboard into an arrangement of decreasing the number of virtual keys in turn from left to right;

when the user holds and operates the mobile terminal with the right hand only, adjusting the layout of the virtual keyboard into an arrangement of decreasing the number of virtual keys in turn from right to left.

According to a third aspect of the embodiments of the present disclosure, a mobile terminal is provided, which includes a device for adaptively adjusting a layout of a touch input panel, wherein the device includes:

an input information counting component, which is configured to count error input information of virtual keys in real time when a user performs a touch input operation using an input panel;

a holding mode judgement component, which is configured to judge, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; and a panel layout adjustment component, which is configured to adjust an overall layout of the input panel and a current UI according to a current holding mode of the user, and arrange the virtual keys to places where the single hand of the user holding the mobile terminal is capable of completely controlling the virtual keys.

In an example embodiment, the above mobile terminal is a mobile phone or a tablet computer.

In the above embodiments, by determining, through statistics collection and analysis, the region in which error inputs occur, the holding mode of the user can be determined, and an overall layout of the input panel and a current UI can be adjusted according to the current holding mode of the user, so that the virtual keys can be arranged to places where the single hand of the user holding the mobile terminal is capable of completely controlling the virtual keys. The solution of the embodiments of the present disclosure can automatically adapt the layout of the input panel to usage habits of a user, reduce input errors and improve the user experience.

The purpose implementation, function features and advantages of the present disclosure are further described below in conjunction with embodiments by reference to accompanying drawings.

DETAILED DESCRIPTION OF THE EMBODIMENTS

It should be understood that specific embodiments described below are merely to illustrate the present disclosure rather than to limit the present disclosure.

Figure 1:
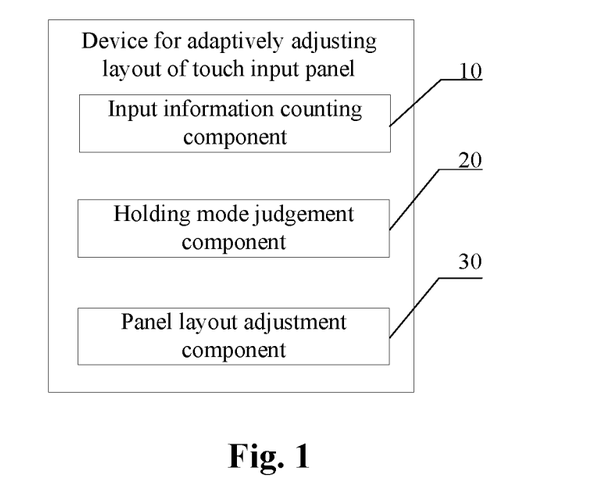
FIG. 1 is a structure diagram of a device for adaptively adjusting a layout of a touch input panel according to one embodiment of the present disclosure.

FIG. 1 is a structure diagram of a device for adaptively adjusting a layout of a touch input panel according to one embodiment of the present disclosure. In this embodiment, the device for adaptively adjusting the layout of the touch input panel includes:

an input information counting component 10, which is configured to count error input information of virtual keys in real time when a user performs a touch input operation using an input panel; for example, when a user edits a short message using the input panel of a mobile terminal, the input information counting component 10 waits for the user to touch the virtual keys so as to acquire the input characters and corresponding virtual key information;

a holding mode judgement component 20, which is configured to judge, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; for example, if the error inputs occurring in the left region are apparently more than the error inputs occurring in the right region, then the holding mode judgement component 20 judges that the user is holding and operating the mobile terminal with a single hand and specifically by the right hand; otherwise, the holding mode judgement component 20 judges that the user is holding and operating the mobile terminal with a single hand and specifically by the left hand;

a panel layout adjustment component 30, which is configured to adjust an overall layout of the input panel and a current UI according to a current holding mode of the user, and arrange the virtual keys to places where the single hand of the user holding the mobile terminal is capable of completely controlling the virtual keys; for example, if the user holds the mobile terminal with the right hand, the panel layout adjustment component 30 arranges the virtual keys to places where the right hand of the user is capable of completely controlling them; if the user holds the mobile terminal with the left hand, the panel layout adjustment component 30 arranges the virtual keys to places where the left hand of the user is capable of completely controlling them.

By counting the error input information of virtual keys through the input information counting component 10, analyzing the region in which error inputs occur and judging the holding mode of the user through the holding component judgement component 20, and adjusting an overall layout of the input panel and a current UI according to a current holding mode of the user and arranging the virtual keys to places where the single hand of the user holding the mobile terminal is capable of completely controlling the virtual keys through the panel layout adjustment component 30, the embodiment of the present disclosure can automatically adapt the layout of the input panel to usage habits of a user, reduce input errors and improve the user experience.

In an example embodiment, the input information counting component 10 is specifically configured to:
acquire press information of the user;
judge whether a virtual key pressed the second-to-last time is a Delete key;
when the virtual key pressed the second-to-last time is the Delete key, count this input operation as an error input.

In this embodiment, the input information counting component 10 waits for the user to touch the virtual keys so as to acquire the input information. An example implementation, the input information counting component 10 may acquire three or more times of virtual key touch operations performed by the user to perform the judgement. If the user makes error input, the user will generally delete the input error character and input the correct character. Therefore, after the user finishes inputting, the input information counting component 10 judges whether a virtual key pressed the second-to-last time is a Delete key; when the virtual key pressed the second-to-last time is the Delete key, it is indicated that the user has had an error input. During a complete input process, there might be several Delete operations, if all of which are counted, it would be difficult to determine the region in which the error inputs occur; therefore, the embodiment of the present disclosure judges whether a virtual key pressed the second-to-last time is a Delete key after the user finishes inputting so as to determine the region in which the error inputs occur.

In an example embodiment of the present disclosure, the holding mode judgement component 20 is specifically configured to:
judge whether a key corresponding to the error input is adjacent to a key pressed the last time;
when the key corresponding to the error input is adjacent to the key pressed the last time, continue to judge whether the key corresponding to the error input is located on a left side or a right side of an initial layout of the virtual keys; when the key corresponding to the error input is located on the left side of the initial layout of the virtual keys, add one to a value of a counter for counting error inputs on the left side; when the key corresponding to the error input is located on the right side of the initial layout of the virtual keys, add one to a value of a counter for counting error inputs on the right side.

Figure 2:
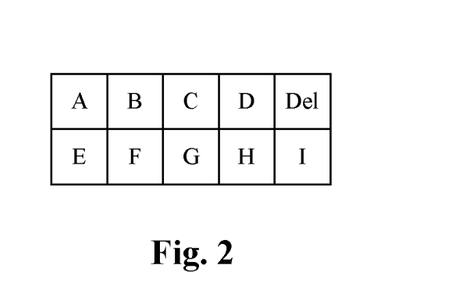
FIG. 2 is a structure diagram of the initial layout of virtual keys according to an embodiment of the present disclosure.

The holding mode judgement component 20 judges whether a key corresponding to the error input is adjacent to a key pressed the last time; if the key corresponding to the error input is not adjacent to the key pressed the last time, the input information counting component 10 waits for the user to touch virtual keys; if the key corresponding to the error input is adjacent to the key pressed the last time, the holding mode judgement component 20 continues to judge whether the key corresponding to the error input is located on a left side or a right side of an initial layout of the virtual keys. Specifically, as shown in FIG. 2, the holding mode judgement component 20 determines on which side of the layout (shown in FIG. 2) the key corresponding to the error input is located, that is, the left side or the right side. If the key corresponding to the error input is located on the left side, the value Num_Err_Left of the counter for counting the error inputs on the left side is increased by 1; if the key corresponding to the error input is located on the right side, the value Num_Err_Right of the counter for counting the error inputs on the right side is increased by 1.

Further, the holding mode judgement component 20 is further configured to:

compare the value of the counter for counting the error inputs on the left side with the value of the counter for counting the error inputs on the right side;

when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, judge that the user is holding and operating the mobile terminal with the right hand only;

when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, judge that the user is holding and operating the mobile terminal with the left hand only.

In this embodiment, the preset value may be defined by the mobile terminal manufacturer or the user, which might be set to 5 or 10 or a larger number. The larger the preset value, the more accurate the judgement on whether the user is holding and operating the mobile terminal with the right hand or the left hand only. If the value of Num_Err_Left is far greater than that of the Num_Err_Right, it is indicated that the virtual keys corresponding to the error inputs are all on the left side, then it can be concluded that the user is holding and operating the mobile terminal with the right hand only; if the value of Num_Err_Right is far greater than that of the Num_Err_Left, it is indicated that the virtual keys corresponding to the error inputs are all on the right side, then it can be concluded that the user is holding and operating the mobile terminal with the left hand only.

Figure 3:
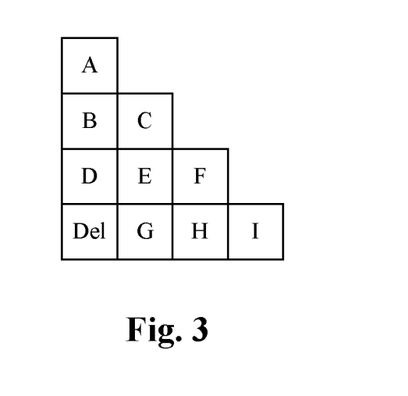
FIG. 3 is a structure diagram of the adjusted layout of virtual keys according to one embodiment of the present disclosure.
Figure 4:
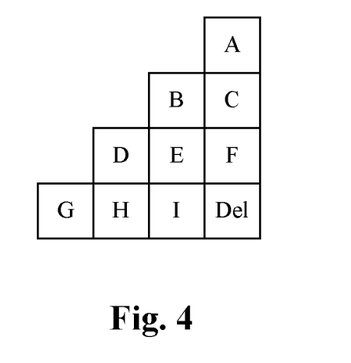
FIG. 4 is a structure diagram of the adjusted layout of virtual keys according to another embodiment of the present disclosure.

In an example embodiment of the present disclosure, the panel layout adjustment component 30 is specifically configured to:

when the user holds and operates the mobile terminal with the left hand only, adjust a layout of a virtual keyboard into an arrangement of decreasing the number of virtual keys in turn from left to right; for example, the layout arrangement of the virtual keyboard may be referred to FIG. 3, which shows the arrangement of decreasing the number of virtual keys in turn from left to right;

when the user holds and operates the mobile terminal with the right hand only, adjust the layout of the virtual keyboard into an arrangement of decreasing the number of virtual keys in turn from right to left; for example, the layout arrangement of the virtual keyboard may be referred to FIG. 4, which shows the arrangement of decreasing the number of virtual keys in turn from right to left.

In the embodiments of the present disclosure, the panel layout adjustment component 30 adjusts an overall layout of the input panel and a current UI according to a current holding mode of the user, and arranges the virtual keys to places where the single hand of the user holding the mobile terminal is capable of completely controlling the virtual keys, thus the embodiments of the present disclosure can automatically adapt the layout of the input panel to usage habits of a user, reduce input errors and improve the user experience.

Figure 5:
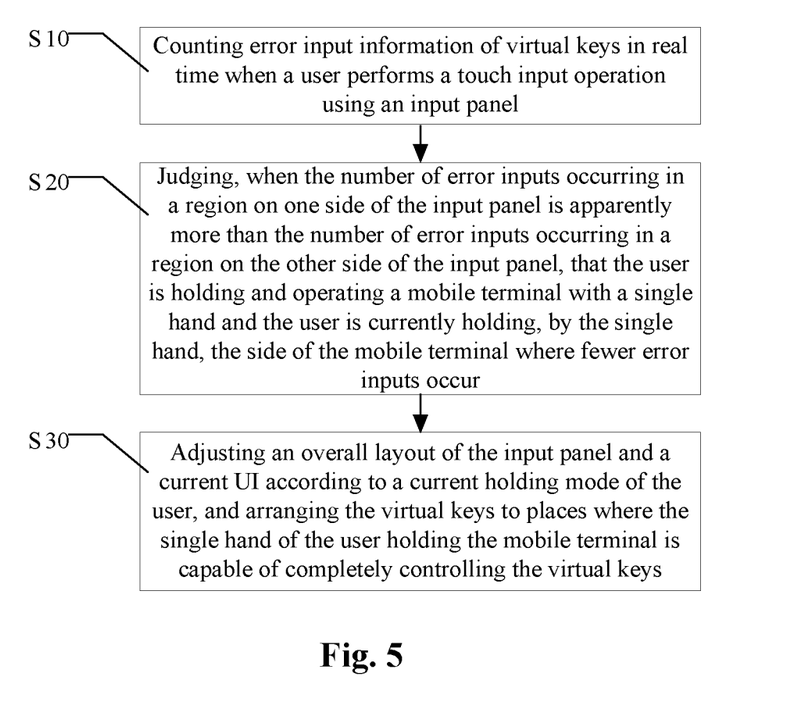
FIG. 5 is a flowchart of a method for adaptively adjusting a layout of a touch input panel according to one embodiment of the present disclosure.

Another embodiment of the present disclosure provides a method for adaptively adjusting a layout of a touch input panel, which is realized based on the device for adaptively adjusting the layout of the touch input panel described above. As shown in FIG. 5, in one embodiment of the present disclosure the method for adaptively adjusting the layout of the touch input panel includes the following steps S10 to S30.

S10: error input information of virtual keys is counted in real time when a user performs a touch input operation using an input panel. For example, when a user edits a short message using the input panel of a mobile terminal, the device waits for the user to touch the virtual keys so as to acquire the input characters and corresponding virtual key information.

S20: when the number of error inputs occurring in a region on one side of the input panel is apparently more than the number of error inputs occurring in a region on the other side of the input panel, it is judged that the user is holding and operating a mobile terminal with a single hand and the user is currently holding, by the single hand, the side of the mobile terminal where fewer error inputs occur. For example, if the error inputs occurring in the left region are apparently more than the error inputs occurring in the right region, then it can be judged that the user is holding and operating the mobile terminal with a single hand and specifically by the right hand; otherwise, it can be judged that the user is holding and operating the mobile terminal with a single hand and specifically by the left hand.

S30: an overall layout of the input panel and a current UI are adjusted according to a current holding mode of the user, and the virtual keys are arranged to places where the single hand of the user holding the mobile terminal is capable of completely controlling the virtual keys. For example, if the user holds the mobile terminal with the right hand, the virtual keys can be arranged to places where the right hand of the user is capable of completely controlling them; if the user holds the mobile terminal with the left hand, the virtual keys can be arranged to places where the left hand of the user is capable of completely controlling them.

Figure 6:
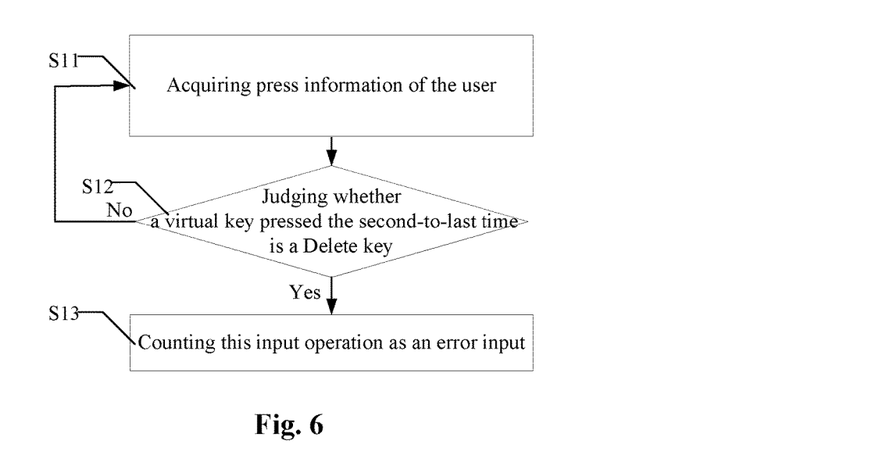
FIG. 6 is a flowchart of a method for adaptively adjusting a layout of a touch input panel according to another embodiment of the present disclosure.

As shown in FIG. 6, step S10 might further include:

S11: press information of the user is acquired; for example, three or more times of virtual key touch operations performed by the user can be acquired to perform judgement.

S12: it is judged whether a virtual key pressed the second-to-last time is a Delete key. If the user makes error input, the user will generally delete the input error character and input the correct character. Therefore, after the user finishes inputting, it is judged whether a virtual key pressed the second-to-last time is a Delete key; when the virtual key pressed the second-to-last time is the Delete key, it is indicated that the user has had an error input.

S13: when the virtual key pressed the second-to-last time is the Delete key, this input operation is counted as an error input. During a complete input process, there might be several Delete operations, if all of which are counted, it would be difficult to determine the region in which the error inputs occur; therefore, the embodiment of the present disclosure judges whether a virtual key pressed the second-to-last time is a Delete key after the user finishes inputting so as to determine the region in which the error inputs occur.

Figure 7:
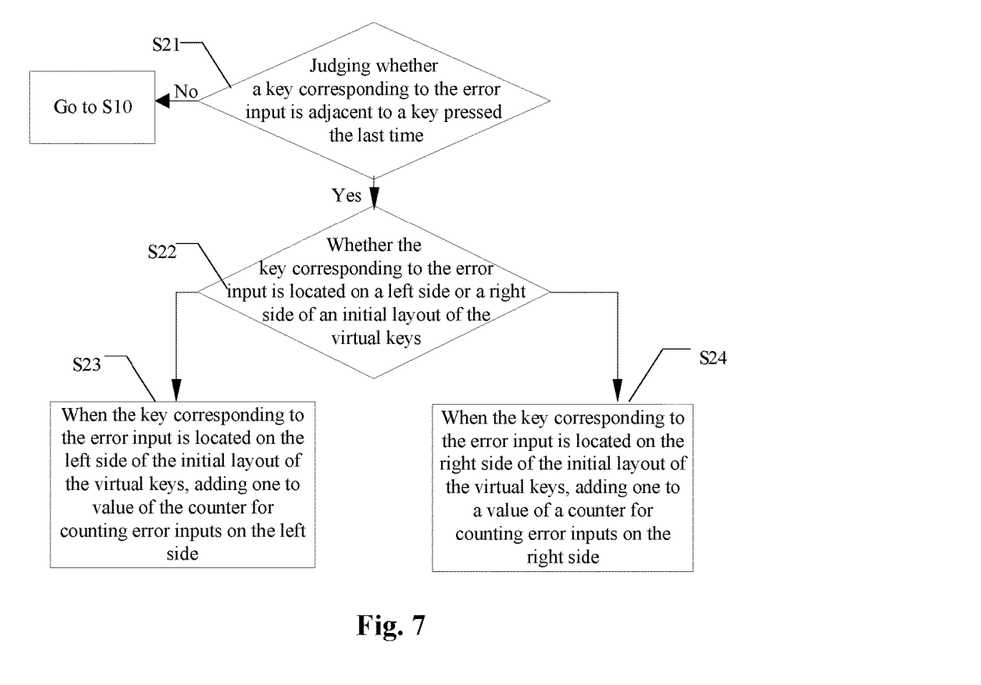
FIG. 7 is a flowchart of a method for adaptively adjusting a layout of a touch input panel according to a third embodiment of the present disclosure.

As shown in FIG. 7, in the embodiment of the present disclosure, S20 might further include:

S21: it is judged whether a key corresponding to the error input is adjacent to a key pressed the last time.

S22: when the key corresponding to the error input is adjacent to the key pressed the last time, continue to judge whether the key corresponding to the error input is located on a left side or a right side of an initial layout of the virtual keys.

S23: when the key corresponding to the error input is located on the left side of the initial layout of the virtual keys, one is added to value of the counter for counting error inputs on the left side.

S24: when the key corresponding to the error input is located on the right side of the initial layout of the virtual keys, one is added to a value of a counter for counting error inputs on the right side.

Figure 8:
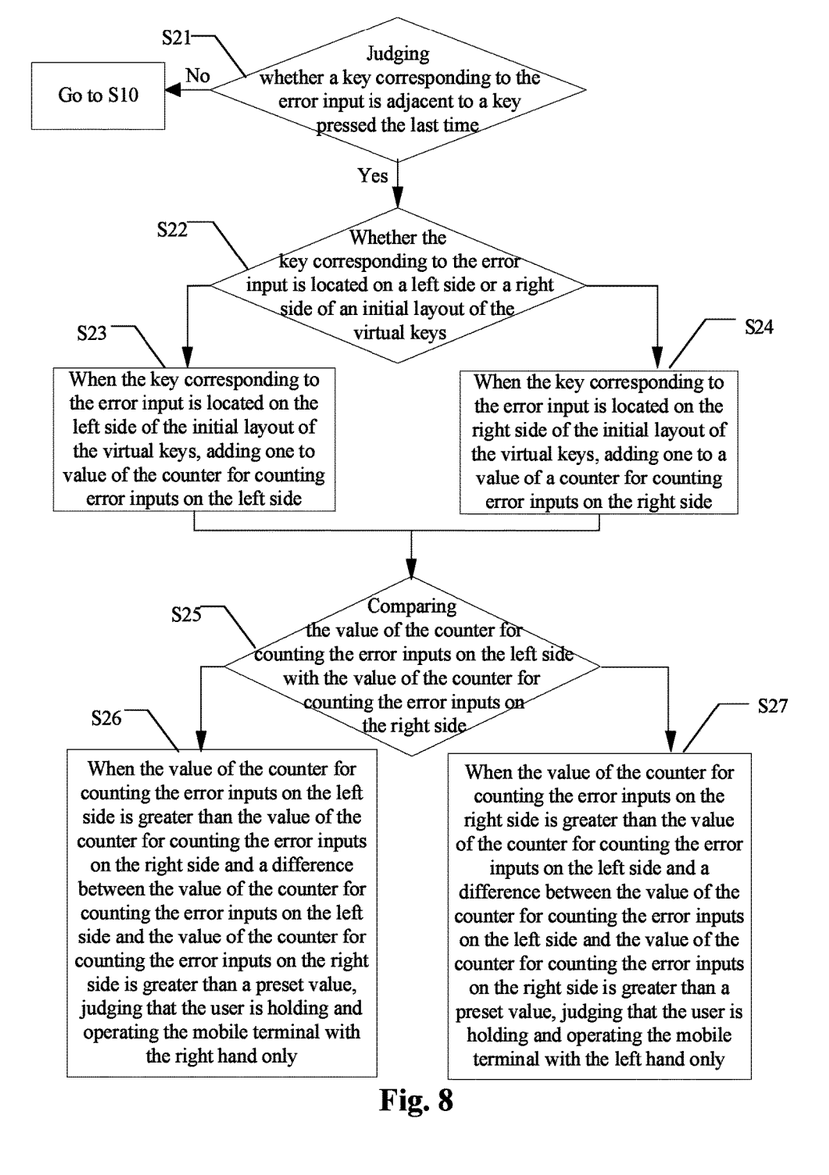
FIG. 8 is a flowchart of a method for adaptively adjusting a layout of a touch input panel according to a fourth embodiment of the present disclosure.

As shown in FIG. 8, in the embodiment of the present disclosure, S20 might further include:

S25: the value of the counter for counting the error inputs on the left side is compared with the value of the counter for counting the error inputs on the right side.

S26: when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, it is judged that the user is holding and operating the mobile terminal with the right hand only.

S27: when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, it is judged that the user is holding and operating the mobile terminal with the left hand only.

In this embodiment, the preset value may be defined by the mobile terminal manufacturer or the user, which might be set to 5 or 10 or a larger number. The larger the preset value, the more accurate the judgement on whether the user is holding and operating the mobile terminal with the right hand or the left hand only. If the value of Num_Err_Left is far greater than that of the Num_Err_Right, it is indicated that the virtual keys corresponding to the error inputs are all on the left side, then it can be concluded that the user is holding and operating the mobile terminal with the right hand only; if the value of Num_Err_Right is far greater than that of the Num_Err_Left, it is indicated that the virtual keys corresponding to the error inputs are all on the right side, then it can be concluded that the user is holding and operating the mobile terminal with the left hand only.

In an example embodiment of the present disclosure, S30 might further include:

when the user holds and operates the mobile terminal with the left hand only, adjusting a layout of a virtual keyboard into an arrangement of decreasing the number of virtual keys in turn from left to right; for example, the layout arrangement of the virtual keyboard may be referred to FIG. 3, which shows the arrangement of decreasing the number of virtual keys in turn from left to right.

when the user holds and operates the mobile terminal with the right hand only, adjusting the layout of the virtual keyboard into an arrangement of decreasing the number of virtual keys in turn from right to left; for example, the layout arrangement of the virtual keyboard may be referred to FIG. 4, which shows the arrangement of decreasing the number of virtual keys in turn from right to left.

Another embodiment of the present disclosure provides a mobile terminal, which includes the device for adaptively adjusting the layout of the touch input panel described above. The structure, function and working principle of the device can be referred to the above embodiments, and no detailed description is needed here. It should be noted that the device for adaptively adjusting the layout of the touch input panel might be software embedded into a mobile terminal, wherein the mobile terminal might be an electronic product having a touch screen input device, such as, mobile phone, tablet computer and the like. By virtue of the device for adaptively adjusting the layout of the touch input panel, the mobile terminal in the embodiment of the present disclosure can automatically adapt the layout of the input panel to usage habits of a user, reduce input errors and improve the user experience, thereby having a broad prospect.

The above are the example embodiments of the present disclosure only and are not intended to limit the patent scope of the present disclosure. Any equivalent structures or equivalent flow modifications made according to the description and the accompanying drawings of the present disclosure, which are applied to other relevant technical fields directly or indirectly, are deemed to be included in the patent protection scope defined by the claims of the present disclosure.

What is claimed is:

1. A device for adaptively adjusting a layout of a touch input panel, comprising:
   a hardware processor, configured to execute programming components stored in a memory, wherein the programming components comprise:
   an input information counting component, which is configured to count error input information of virtual keys in real time when a user performs a touch input operation using an input panel;
   a holding mode judgement component, which is configured to judge, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; and
   a panel layout adjustment component, which is configured to adjust an overall layout of the input panel and a current user interface (UI) according to a current holding mode of the user, and arrange the virtual keys to places where the single hand of the user holding the mobile terminal is capable of completely controlling the virtual keys;
   wherein the holding mode judgment component is further configured to: judge whether a key corresponding to the error input is adjacent to a key pressed the last time when the key corresponding to the error input is adjacent to the key pressed the last time, continue to judge whether the key corresponding to the error input is located on a left side or a right side of an initial layout of the virtual keys; when the key corresponding to the error input is located on the left side of the initial layout of the virtual keys, add one to a value of a counter for counting error inputs on the left side; when the key corresponding to the error input is located on the right side of the initial layout of the virtual keys, add one to a value of a counter for counting error inputs on the right side;
   wherein the holding mode judgement component is further configured to:
   compare the value of the counter for counting the error inputs on the left side with the value of the counter for counting the error inputs on the right side;
   when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, judge that the user is holding and operating the mobile terminal with the right hand only;

when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, judge that the user is holding and operating the mobile terminal with the left hand only;

wherein the panel layout adjustment component is further configured to: when the user holds and operates the mobile terminal with the left hand only, adjust a layout of a virtual keyboard into an arrangement of decreasing the number of virtual keys in turn from left to right; when the user holds and operates the mobile terminal with the right hand only, adjust the layout of the virtual keyboard into an arrangement of decreasing the number of virtual keys in turn from right to left, wherein adjusting the layout of the virtual keyboard into an arrangement of decreasing the number of virtual keys in turn from left to right comprises arranging the virtual keys into at least two columns where the left most column contains more virtual keys than columns positioned to the right of the left most column, wherein adjusting the layout of the virtual keyboard into an arrangement of decreasing the number of virtual keys in turn from right to left comprises arranging the virtual keys into at least two columns where the right most column contains more virtual keys than columns positioned to the left of the right most column.

2. The device for adaptively adjusting the layout of the touch input panel as claimed in claim 1, wherein the input information counting component is further configured to:
   acquire press information of the user;
   judge whether a virtual key pressed the second-to-last time is a Delete key;
   when the virtual key pressed the second-to-last time is the Delete key, count this input operation as an error input.

3. A mobile terminal, comprising the device for adaptively adjusting the layout of the touch input panel as claimed in claim 1.

4. The mobile terminal as claimed in claim 3, wherein the mobile terminal is a mobile phone or a tablet computer.

5. A mobile terminal, comprising the device for adaptively adjusting the layout of the touch input panel as claimed in claim 2.

6. A method for adaptively adjusting a layout of a touch input panel, comprising:
   counting error input information of virtual keys in real time when a user performs a touch input operation using an input panel;
   judging, when the number of error inputs occurring in a region on one side of the input panel is apparently more than the number of error inputs occurring in a region on the other side of the input panel, that the user is holding and operating a mobile terminal with a single hand and the user is currently holding, by the single hand, the side of the mobile terminal where fewer error inputs occur; and adjusting an overall layout of the input panel and a current user interface (UI) according to a current holding mode of the user, and arranging the virtual keys to places where the single hand of the user holding the mobile terminal is capable of completely controlling the virtual keys;

wherein judging, when the number of error inputs occurring in a region on one side of the input panel is apparently more than the number of error inputs occurring in a region on the other side of the input panel, that the user is holding and operating the mobile terminal with a single hand and the user is currently holding, by the single hand, the side of the mobile terminal where fewer error inputs occur comprises: judging whether a key corresponding to the error input is adjacent to a key pressed the last time; when the key corresponding to the error input is adjacent to the key pressed the last time, continuing to judge whether the key corresponding to the error input is located on a left side or a right side of an initial layout of the virtual keys; when the key corresponding to the error input is located on the left side of the initial layout of the virtual keys, adding one to a value of a counter for counting error inputs on the left side; when the key corresponding to the error input is located on the right side of the initial layout of the virtual keys, adding one to a value of a counter for counting error inputs on the right side;

wherein judging, when the number of error inputs occurring in a region on one side of the input panel is apparently more than the number of error inputs occurring in a region on the other side of the input panel, that the user is holding and operating the mobile terminal with a single hand and the user is currently holding, by the single hand, the side of the mobile terminal where fewer error inputs occur further comprises:

comparing the value of the counter for counting the error inputs on the left side with the value of the counter for counting the error inputs on the right side;

when the value of the counter for counting the error inputs on the left side is greater than the value of the counter for counting the error inputs on the right side and a difference between the value of the counter for counting the error inputs on the left side and the value of the counter for counting the error inputs on the right side is greater than a preset value, judging that the user is holding and operating the mobile terminal with the right hand only;

when the value of the counter for counting the error inputs on the right side is greater than the value of the counter for counting the error inputs on the left side and a difference between the value of the counter for counting the error inputs on the left side and the value of the counter for counting the error inputs on the right side is greater than a preset value, judging that the user is holding and operating the mobile terminal with the left hand only wherein adjusting the overall layout of the input panel and the current UI according to the current holding mode of the user, and arranging the virtual keys to places where the single hand of the user holding the mobile terminal is capable of completely controlling the virtual keys comprises: when the user holds and operates the mobile terminal with the left hand only, adjusting a layout of a virtual keyboard into an arrangement of decreasing the number of virtual keys in turn from left to right; when the user holds and operates the mobile terminal with the right hand only, adjusting the layout of the virtual keyboard into an arrangement of decreasing the number of virtual keys in turn from right to left, wherein adjusting the layout of the virtual keyboard into an arrangement of decreasing the number of virtual keys in turn from left to right comprises arranging the virtual keys into at least two columns where the left most column contains more virtual keys than columns positioned to the right of the left most column, wherein adjusting the layout of the virtual keyboard into an arrangement of decreasing the number of virtual keys in turn from right to left comprises arranging the virtual keys into at least two columns where the right most column contains more virtual keys than columns positioned to the left of the right most column.

7. The method for adaptively adjusting the layout of the touch input panel as claimed in claim 6, wherein counting the error input information of the virtual keys in real time when the user performs the touch input operation using the input panel comprises:

acquiring press information of the user;

judging whether a virtual key pressed the second-to-last time is a Delete key;

when the virtual key pressed the second-to-last time is the Delete key, counting this input operation as an error input.

\* \* \* \* \*